US006996276B2

(12) United States Patent
Liu et al.

(10) Patent No.: US 6,996,276 B2
(45) Date of Patent: *Feb. 7, 2006

(54) METHOD AND APPARATUS FOR DISCRIMINATING BETWEEN DOCUMENTS IN BATCH SCANNED DOCUMENT FILES

(75) Inventors: Ming Liu, Seattle, WA (US); Kevyn Collins-Thompson, Seattle, WA (US); Daryl Lawton, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 131 days.

This patent is subject to a terminal disclaimer.

(21) Appl. No.: 10/840,617

(22) Filed: May 7, 2004

(65) Prior Publication Data

US 2004/0208371 A1 Oct. 21, 2004

Related U.S. Application Data

(63) Continuation of application No. 09/583,049, filed on May 30, 2000, now Pat. No. 6,735,335.

(51) Int. Cl.
*G06K 9/68* (2006.01)
*G06K 9/54* (2006.01)
*G06K 9/60* (2006.01)

(52) U.S. Cl. .................................... 382/218; 382/306
(58) Field of Classification Search ............... 382/112, 382/164, 170, 175–177, 181, 195, 209, 218, 382/219, 220, 306; 358/1.17, 498; 715/517, 715/520, 528–529
See application file for complete search history.

(56) References Cited

U.S. PATENT DOCUMENTS

| 4,153,916 A | 5/1979 | Miwa et al. ................ 358/406 |
| 4,295,206 A | 10/1981 | Cain et al. ..................... 707/7 |
| 4,760,606 A | 7/1988 | Lesnick et al. ............. 382/306 |
| 4,813,077 A * | 3/1989 | Woods et al. ............... 382/138 |
| 5,109,439 A | 4/1992 | Froessl ....................... 382/305 |
| 5,339,412 A | 8/1994 | Fueki ...................... 707/104.1 |
| 6,332,039 B1 | 12/2001 | Bando et al. ............... 382/195 |
| 6,466,336 B1 | 10/2002 | Sturgeon et al. ........... 358/444 |

OTHER PUBLICATIONS

Hearst, Marti A., and Xerox Palo Alto Research Center, "Multi-Paragraph Segmentation of Expository Text," www.sims.berkeley.edu/~hearst/papers/tiling-acl94/acl94.html, Jun. 1994, pp. 1-15.
Conway, "Page grammars and page parsing a syntactic approach to document layout recognition", IEEE, pp. 761-764, 1993.
Jacobs, et al., "Fast multi-resolution image querying", ACM, pp. 277-286, 1995.

* cited by examiner

*Primary Examiner*—Daniel Miriam
(74) *Attorney, Agent, or Firm*—Banner & Witcoff, Ltd.

(57) ABSTRACT

Discriminating between documents scanned in a batch scanning process is achieved based on various analyses of the constituent document pages. The data provided by the various analyses are compared with each other to determine whether successive pages belong to the same document. Scanned documents result in a page sequence that is analyzed to extract one or more feature attributes for each page. The feature attributes are provided to a feature comparison process in order to assess the similarity of successive pages. If a sufficient likelihood of similarity is found, the compared pages are deemed to be from the same document; otherwise, they are deemed to be from different documents, indicating the existence of a document break. Based on the document breaks, separate scan files may be established. In this manner, the present invention represents eliminates the requirement of user intervention.

16 Claims, 6 Drawing Sheets

METHOD AND APPARATUS FOR DISCRIMINATING BETWEEN DOCUMENTS IN BATCH SCANNED DOCUMENT FILES

This application is a continuation of and claims priority from allowed application Ser. No. 09/583,049, filed May 30, 2000, issuing as U.S. Pat. No. 6,735,335, the content of which is herein incorporated by reference in its entirety.

TECHNICAL FIELD

The present invention relates generally to batch scanning and, in particular, to a method and apparatus for discriminating between documents in batch scanned document files.

BACKGROUND OF THE INVENTION

Document scanners are well known in the art. Generally, document scanners are devices that optically scan a printed page to provide data representative of the scanned page (e.g., a scan file) which data can be stored and/or manipulated, typically by a computer.

Batch scanners, a particular type of document scanner, are becoming more prevalent. In a batch scanner, several documents are gathered together and scanned into a computer all at once. However, unless techniques are employed to discriminate between documents during the scanning process, the scan data resulting from the scanning of the documents will be encompassed by a single scan file. As a result, users of the scan file are not provided with any indication within the scan data where one document ends and another one begins. It thus becomes a manual process for a user to inspect the resulting scan data and determine where various documents begin and end. If the user wishes to store separate documents in separate scan files, he/she must manually separate the documents from the scan data and save them as separate files.

Currently, various techniques are used in order to discriminate when one document ends and another starts, thereby allowing the creation of separate scan files when using a batch scan process. One solution is to include separator pages comprising some type of indicia (e.g., bar codes, predetermined patterns, blank pages, etc.) making them recognizable by the scanner as a separator page. Based on the occurrence of the separator page, separate scan files can be generated, either by the scanner itself or by a computer that receives the scan data. While separator pages function adequately for this purpose, they do require a user to manually insert them between documents. Another solution is to put an indicator marking the first or last page of document directly onto the pages of each of the documents. Again, this solution requires user intervention prior to the scanning operation.

Thus, a need exists for a technique of discriminating between documents during batch processing and that does not require, as in prior art techniques, user intervention or the manual manipulation of the documents prior to batch scanning. Such a technique should preferably allow batch scanning to be automated such that separation between documents in scan files are provided automatically, with user intervention being only optional.

SUMMARY OF THE INVENTION

The present invention overcomes prior art limitations by providing a technique for discriminating between documents based on various analyses of the documents. The data provided by the various analyses are compared with each other to determine whether successive pages belong to the same document.

In one embodiment, scanned documents result in a page sequence. The page sequence is then analyzed to extract at least one feature attribute for each page using, for example, an optical character recognition (OCR)/layout process to extract text and layout features, and using an image feature process to extract image features. Data representative of the at least one feature attribute is then added to the page sequence to provide an extended page sequence. The extended page sequence is then subjected to a decision process to determine breaks between documents, resulting in a segmented page 'sequence. The decision process, in a preferred embodiment, comprises four different comparison processes (listed in order of decreasing specificity): (i) text feature analysis; (ii) specific layout analysis; (iii) general layout analysis; and (iv) image feature analysis. Regardless of the particular type used, each of the analyses provides a different measurement regarding the similarity between two successive pages. In a preferred embodiment, the features for a current page are compared with the features of at least one previous page, generally in order of decreasing specificity. If a sufficient likelihood of similarity is found, then the compared pages are deemed to be from the same document; otherwise, they are deemed to be from different documents, indicating the existence of a document break. The one or more document breaks thus identified may be indicated within the segmented page sequence. Through the display of the segmented display sequence, a user may optionally modify the location of one or more document breaks. Based on the document breaks, separate scan files may be established. In this manner, the present invention represents advancement over prior art batch scanning techniques in that user intervention is no longer required.

BRIEF DSCRIPTION OF THE DRAWINGS

DETAILED DESCRIPTION OF THE INVENTION

The present invention may be more fully described with reference to FIGS. 1–6.

Figure 1:
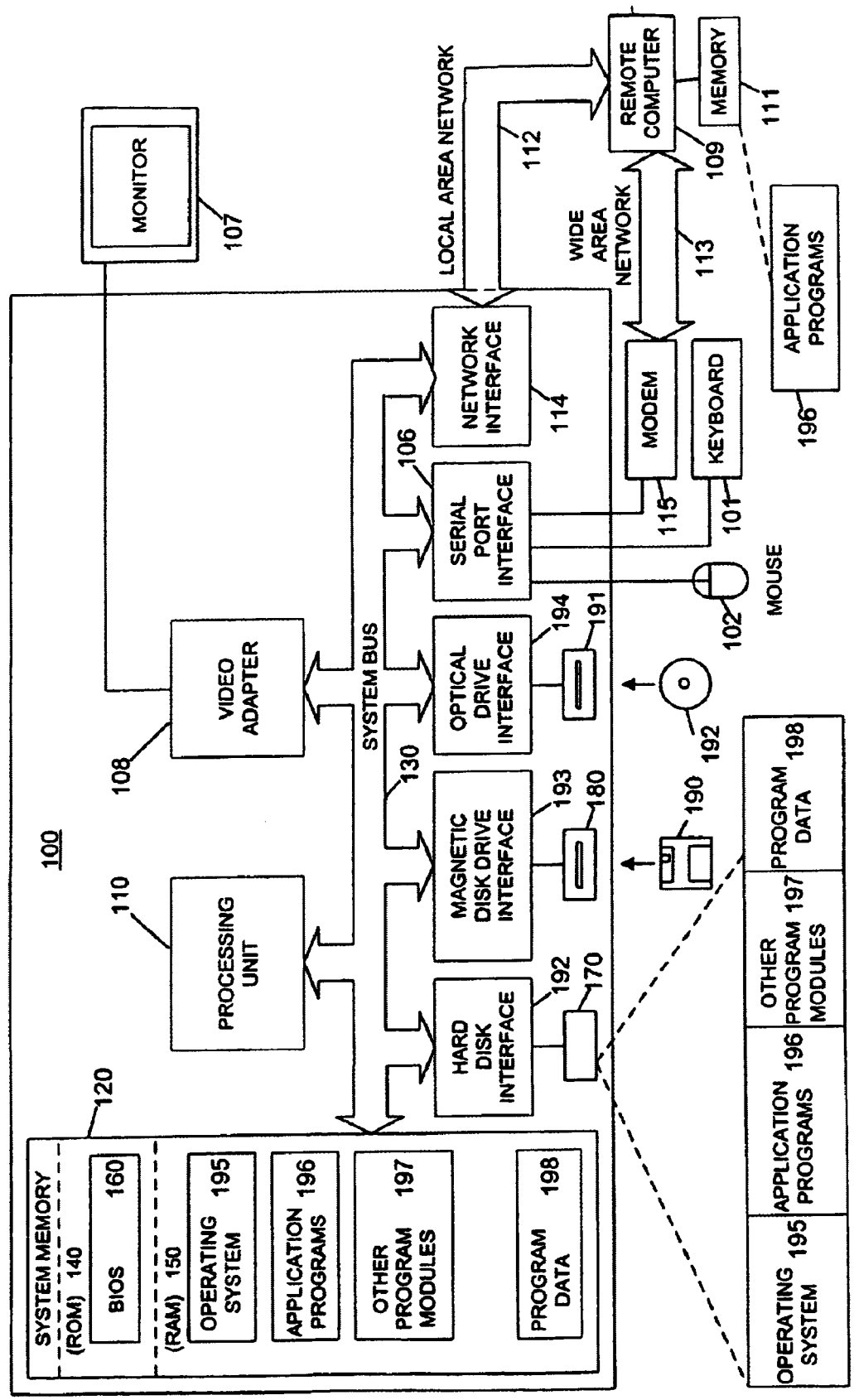
FIG. 1 is a schematic block diagram of a conventional general-purpose digital computing environment that may be used to implement various aspects of the present invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110.

System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices (such as document scanners) are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server.

Figure 2:
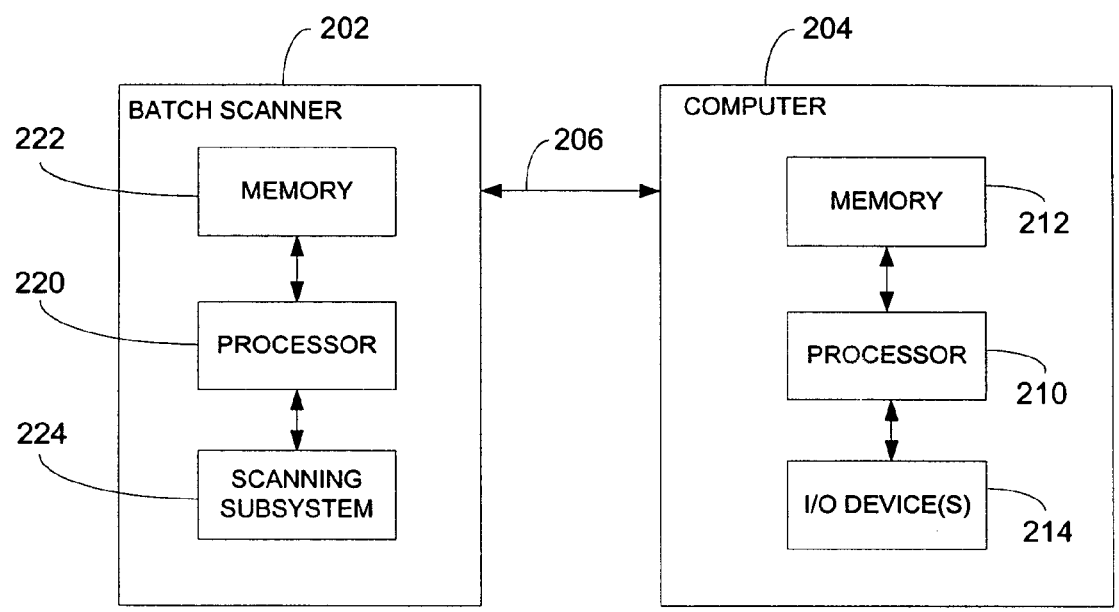
FIG. 2 is a block diagram illustrating exemplary configurations of a batch scanner and computer in accordance with the present invention.

Referring now to FIG. 2, there are illustrated exemplary configurations of a batch scanner 202 and computer 204 in accordance with the present invention. Generally, the computer 204 is similar in structure and operation to the computer 100 illustrated in FIG. 1, and comprises a processor or processing unit 210 coupled to memory 212 and various input/output devices 214. The input/output devices 214 preferably comprise a display, such as a monitor, and a user selection device or devices, such as a keyboard, mouse, touch-pad, touch-screen, voice-activated controller or other similar devices. The processor 210 preferably executes applications stored as executable instructions in the memory 212 and operates upon data also stored in the memory 212, as known in the art.

In a similar manner, the batch scanner 202 comprises a processor 220 coupled to memory 222 and a scanning subsystem 224. The batch scanner 202 may comprise virtually any scanner that supports a feeder. Suitable batch scanners are the SP15C manufactured by Fujitsu or the HP 6200 manufactured by Hewlett Packard. In practice, the batch scanner 202 is typically coupled to the computer 204 via a communication link 206, such as a cable or similar connection. Typically, the scanning subsystem 224 comprises an optical system that generates data representative of one or more document pages (scan data). (Although characterized as an optical system, future developments may result in other types of scanning subsystems equally suitable for use with the present invention. Regardless, as used in describing the present invention, scanning simply implies the use of a scanning subsystem that provides any type of data capable of distinguishing one page from another.) The scan data may be sent by the scanner processor 220 to local memory 222 and/or sent directly to the computer 204 via the communication link 206 for storage within the computer memory 212 and further processing. The processing described below relative to FIGS. 3–6 may be carried out by either the scanner 202 or computer 204, or both, using programming techniques well known to those having ordinary skill in the art. Additionally, specialized hardware may be used to implement some or all of the processing described below.

Figure 3:
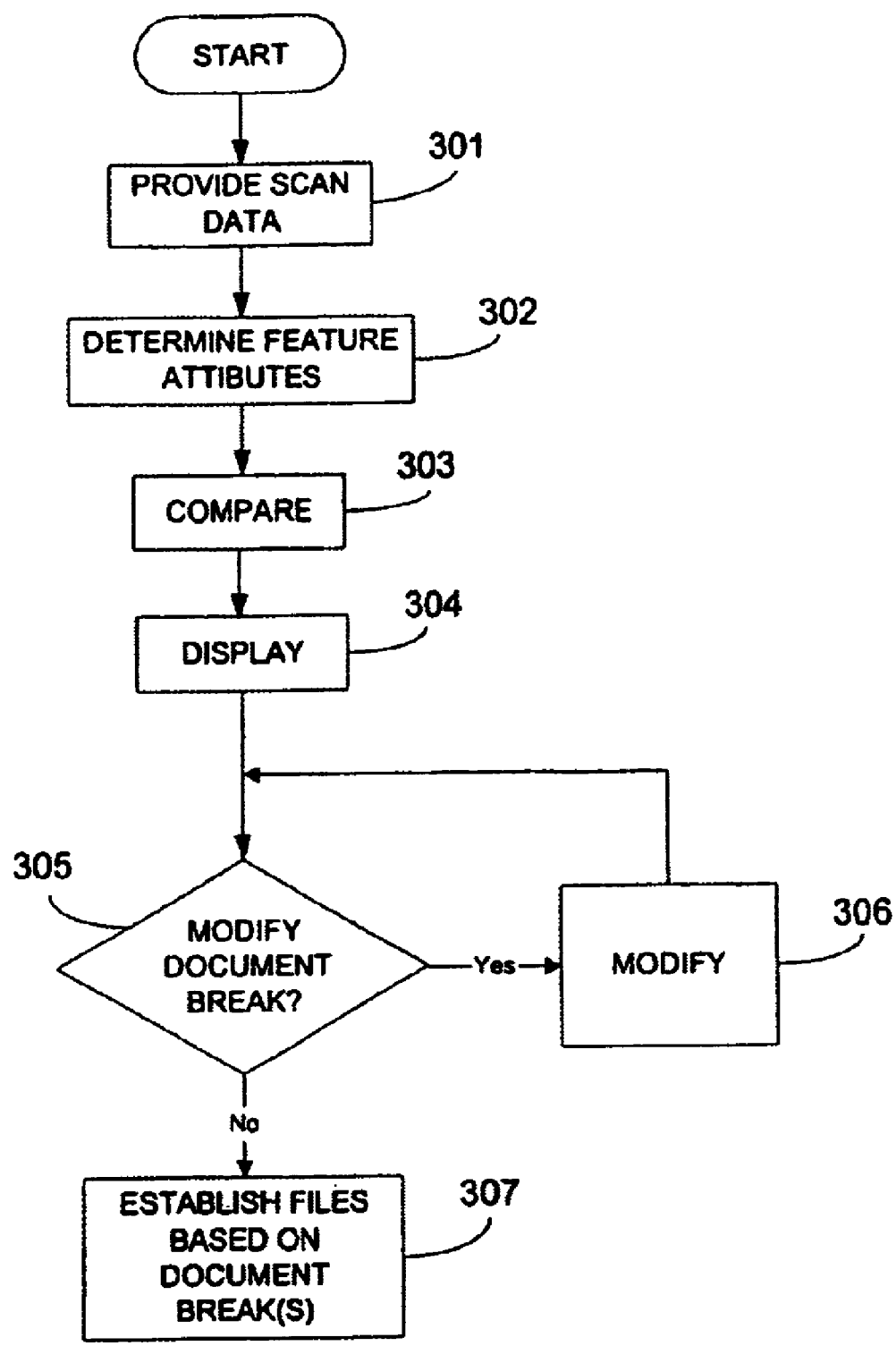
FIG. 3 is a flowchart illustrating a method for discriminating between documents in accordance with the present invention.

Turning now to FIG. 3, a method for discriminating between documents in accordance with the present invention is illustrated in the form of a flowchart. At step 301, scan data is provided as the output of a batch scanning process. As described above, the scan data preferably comprises image data resulting from the optical scanning of multiple documents, as in a batch scanning process. The image data is preferably arranged into a page sequence wherein every page of the scanned documents is separately distinguishable from all other pages.

At step 302, one or more feature attributes are determined for each page in the page sequence. Generally, a feature attribute in the context of the present invention is any discernable characteristic resulting from an analysis of a page; the presence or degree of which characteristic may be compared against other similarly analyzed pages. Specific embodiments of such characteristics are described in greater detail below. The ability of a given feature attribute to act as a predictor of similarity/dissimilarity when compared varies and is largely dependent upon the types of documents being scanned and analyzed. Thus, it is advantageous to use a variety of different feature attributes thereby resulting in a greater probability that correct decisions regarding page similarity (and, consequently, the presence or absence of a document break between pages) will be made in most instances.

At step 303, the one or more feature attributes for each page are compared in order to determine whether document breaks exist within the page sequence. Generally, this entails comparing the one or more feature attributes for a current page against corresponding ones of the one or more feature attributes for at least one previous page relative to the current page. For example, assume that feature attributes A, B and C have been calculated for page X, the current page under consideration. In this case, the measured characteristic of feature attribute A for page X will be compared with the same measured characteristic of feature attribute A for at least page X-I, i.e., the least distant previous page. Similar comparisons may be performed for feature attributes B and C relative to page X-I. Further still, comparisons of features A, B and C for page X may be extended to previous pages X-2 through X-n, where n is a predetermined value indicating how many previous pages are used in the comparisons. Note that the value of n can vary depending on the particular attribute (A, B or C) being compared.

The results of the comparisons described above are used to judge the similarity between the current page and at least one previous page. Generally, if the current page is judged to be sufficiently similar or dissimilar to anyone previous page, based on the comparison of some or all of the feature attributes, then a decision is made that the current page does or does not, respectively, belong to a single document along with the at least one previous page. As those having ordinary skill in the art will recognize, the sufficiency of a comparison of at least one feature attribute to predict similarity or dissimilarity is a matter of design choice. For example, the selection of one or more suitable threshold values may be used to determine whether similarity or dissimilarity is shown relative to a given feature attribute comparison. Further still, adaptive processes may be defined such that threshold values are defined based in part upon, for example, the reliability of the measurements made for a given feature attribute. The present invention is not limited in this regard beyond the need to define what constitutes sufficient similarity or dissimilarity.

As noted above, similarity/dissimilarity may be based on the comparison of some or all of the feature attributes, if more than one feature attribute is used. This implies that several schemes may be used when assessing comparison results. That is, it may be required that: (i) dissimilarity is assumed and all comparisons must show sufficient similarity before a page is adjudged to belong to a previous document, or (ii) dissimilarity is assumed and anyone or more of the comparisons may be used to show that the page belongs to the previous document, or (iii) similarity is assumed and all comparisons must show sufficient dissimilarity before a page is adjudged to not belong to a previous document, or (iv) similarity is assumed and anyone or more of the comparisons may be used to show that the page belongs a different document, or (v) no assumptions are made, and the outcomes of the comparisons for a page are balanced to determine similarity/dissimilarity. In one embodiment described below, the second option (assume dissimilarity, one or more comparisons can show similarity) is used.

Regardless of the number of feature attributes used, the methods for comparing them or the number of previous pages against which they are compared, the outcome of step 303 is that one or more documents breaks will be indicated (assuming that at least two different documents were scanned). A document break is the result of a given page being adjudged sufficiently dissimilar from previous pages such that it is assumed that the given page belongs to a different document.

Steps 304 through 307 represent optional steps. However, in a preferred embodiment, steps 304–307 are implemented. At step 304, the page sequence is displayed (for example, via one of the I/O devices 214) such that that the one or more document breaks are indicated therein. In a preferred embodiment, each of the pages is displayed in a thumbnail format, i.e., reduced in size and resolution, and visual indicia are used to indicate the presence of a document break between pages. Of course, separate pages may be displayed full-size and with full resolution, and other types of indicia may be used to indicate document breaks as a matter of design choice.

Regardless of the manner in which the page sequence is displayed and the document breaks indicated, a user can inspect the document breaks and, if desired, modify one or more document breaks at step 305. Thus, a user can indicate where they would like a document break to occur, as in the case where a document break does not currently exist between two pages, and where they would like to remove a document break, as in the case where a document break has been indicated between two pages that a user knows belong to the same document. In practice, this can be achieved using known computer-based techniques that allow a user to select a given portion of a display and, based on a selection signal generated thereby, cause certain actions to be performed. Selection devices such as a mouse, touch screen, touch pad or other similar devices may be used for this purpose. A preferred embodiment is described below relative to FIG. 6.

If a user does indicate that a document break is to be added, removed or repositioned, the modification is performed at step 306 such that the displayed page sequence now reflects the modification. Additionally at step 306, the data underlying the displayed page sequence, i.e., the data used to generate the display, is also altered to reflect the modification to the document break.

Once the user is satisfied that no further modifications to the document breaks are required, processing continues at step 307 where separate scan files are created based on the document breaks. That is, each scan file comprises a portion of the page sequence corresponding to a single one of the originally scanned documents. Such files may be created automatically or at the command of a user. Regardless, the technique described herein relative to FIG. 3 substantially eliminates the requirement, while not wholly eliminating the possibility, of user intervention when attempting to differentiate between documents resulting from batch scanning operations.

Figure 4:
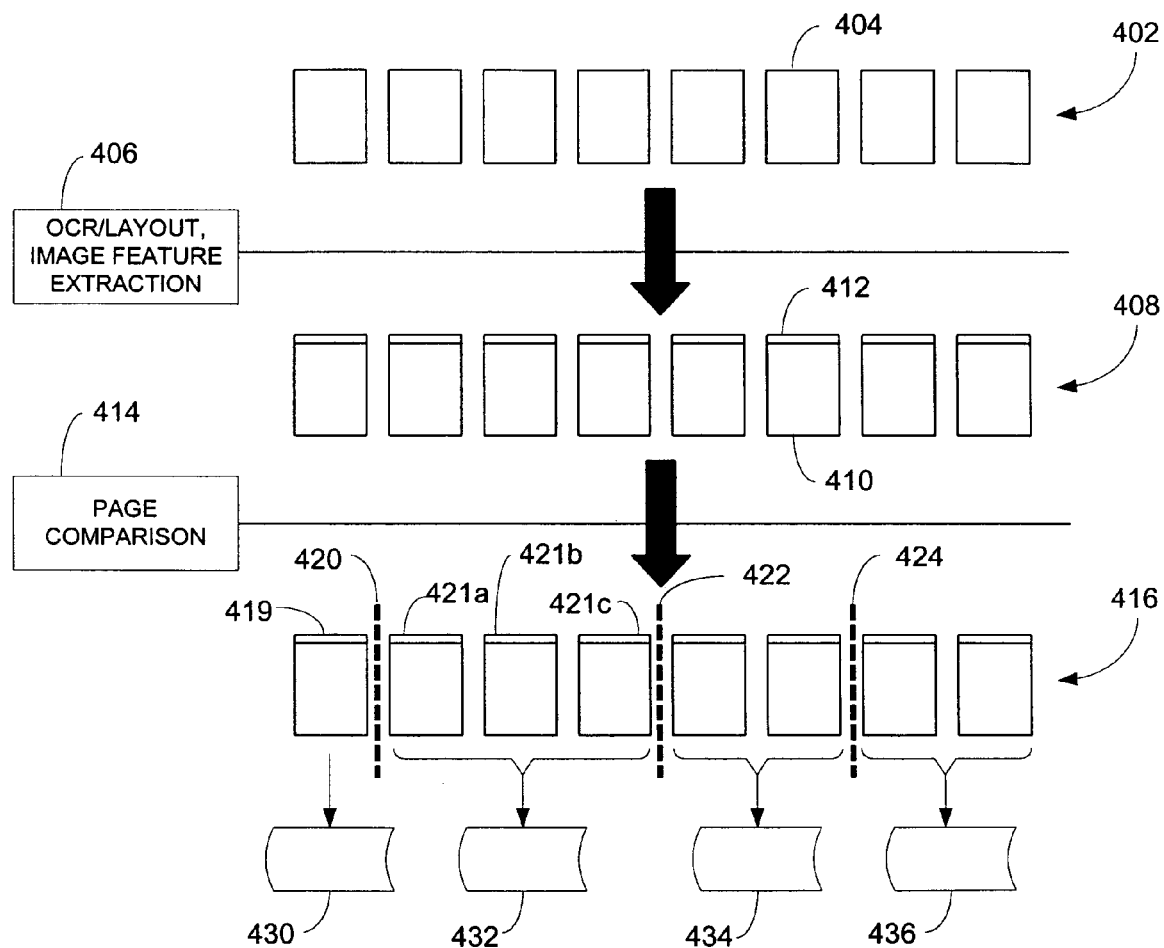
FIG. 4 is a schematic illustration of the creation and processing of various page sequences in accordance with one embodiment of the present invention.

FIG. 4 provides a more detailed illustration of the creation and processing of various page sequences in accordance with one embodiment of the present invention. In particular, a page sequence 402 is provided as the output of a batch scanning process in the form of scan data. The page sequence is a series of pages 404 defined by corresponding portions of the scan data (preferably image data) derived during the scanning process. As shown, the page sequence 402 is subjected to an analysis 406 resulting in the creation of feature attribute data 412. The analysis 406 preferably comprises several types including an optical character recognition (OCR) or text feature/layout feature analysis and an image feature analysis. The output of these analyses results in the feature attribute data 412, which feature attribute data 412 is then preferably appended to corresponding pages 410 to provide an extended page sequence 408. Preferably, the file format for the extended page sequence is TIFFPLUS. In practice, the analysis 406 and creation of the extended page sequence 408 may be carried out by the scanning device or a computer couple thereto, as noted above. Regardless, the OCR/layout feature analysis can be done using existing OCR packages such as the TextBridge API sold by ScanSoft or the Expervision Software Developers Kit sold by Expervision.

As known in the art, the OCR analysis results in a text file associated with a scanned page and a closely related file containing page layout attributes. The layout attributes describe a page in terms of regions or blocks, the locations of such blocks, the dimension of such blocks, and individual block line and text statistics. Regions (or blocks) are generally categorized into different types of regions: text, image, vector graphics, table, etc. Line statistics include the number of lines per block, the average width of lines per block, the variance of line width per block and other similar measurements. Text statistics include font types for a given block, word density per block, character density per block and other similar measurements. In addition to the general layout attributes just described, specific layout attributes may also be identified. Specific layout attributes are the typical features that are used to directly specify the sequential organization of a document. These include such features as page numbers, page headers, page footers, headings and captions. These features are highly discriminating when they are can be extracted and tracked.

The textual attributes of a given page are preferably derived by first passing the text file resulting from the OCR analysis through a word breaker, as known in the art, to produce a stream of individual words. The resulting words are then filtered according to rules related to their meaning. Thus, words containing OCR errors may be corrected or discarded. High-frequency terms such as "the" and "is" are removed based on a customizable stop list, i.e., a list of words to be automatically ignored. Optionally, stemming may be performed so that related words, e.g., words sharing a common root such as "computer", "computing" and "uncomputable", are replaced by a root term, e.g., "comput-".

Image attributes refer to those attributes based on the overall appearance of the page, such as color and intensity histograms, statistics on the connected components, wavelet coefficients, etc. In a currently preferred embodiment, low frequency wavelet coefficients are used to provide a rough measure of similarity between pages. Wavelet coefficients are well known in the art and are therefore not discussed in detail here. It should be noted that, in general, there is overlap between the information represented by the image attributes and the layout attributes.

The layout, textual and image attributes collectively comprise the feature layout data 412 used to create the extended page sequence 408. The extended page sequence 408 is then subjected to a page comparison or page similarity process 414 that, as generally described above, compares the one or more feature attributes for each page against each other to determine the existence of document breaks between successive pages. Assuming that such document breaks exist within the extended page sequence 408, a segmented page sequence 416 is provided as output of the comparison process 414. The segmented page sequence 416 is essentially the extended page sequence 408 augmented to include document breaks 420,422,424 therein. In one embodiment of the present invention, the similarity process 414 maintains a list of the positions of document breaks within the segmented page sequence 416. Those having ordinary skill in the art will recognize that other implementations are possible. Any of the page sequence 402, extended page sequence 408 or segmented page sequence 416 may be stored in memory of the scanner or computer, or on a removable storage device such as a floppy disk, etc. for later processing.

Based on the document breaks 420, 422, 424 separate pages 419 or groups of pages 421 may be subsequently stored in scan files 430-436 representative of the separate documents as originally scanned. Techniques for creating such scan files 430–436, typically using utilities provided by the operating system of the host-computing platform, are well known in the art.

Figure 5:
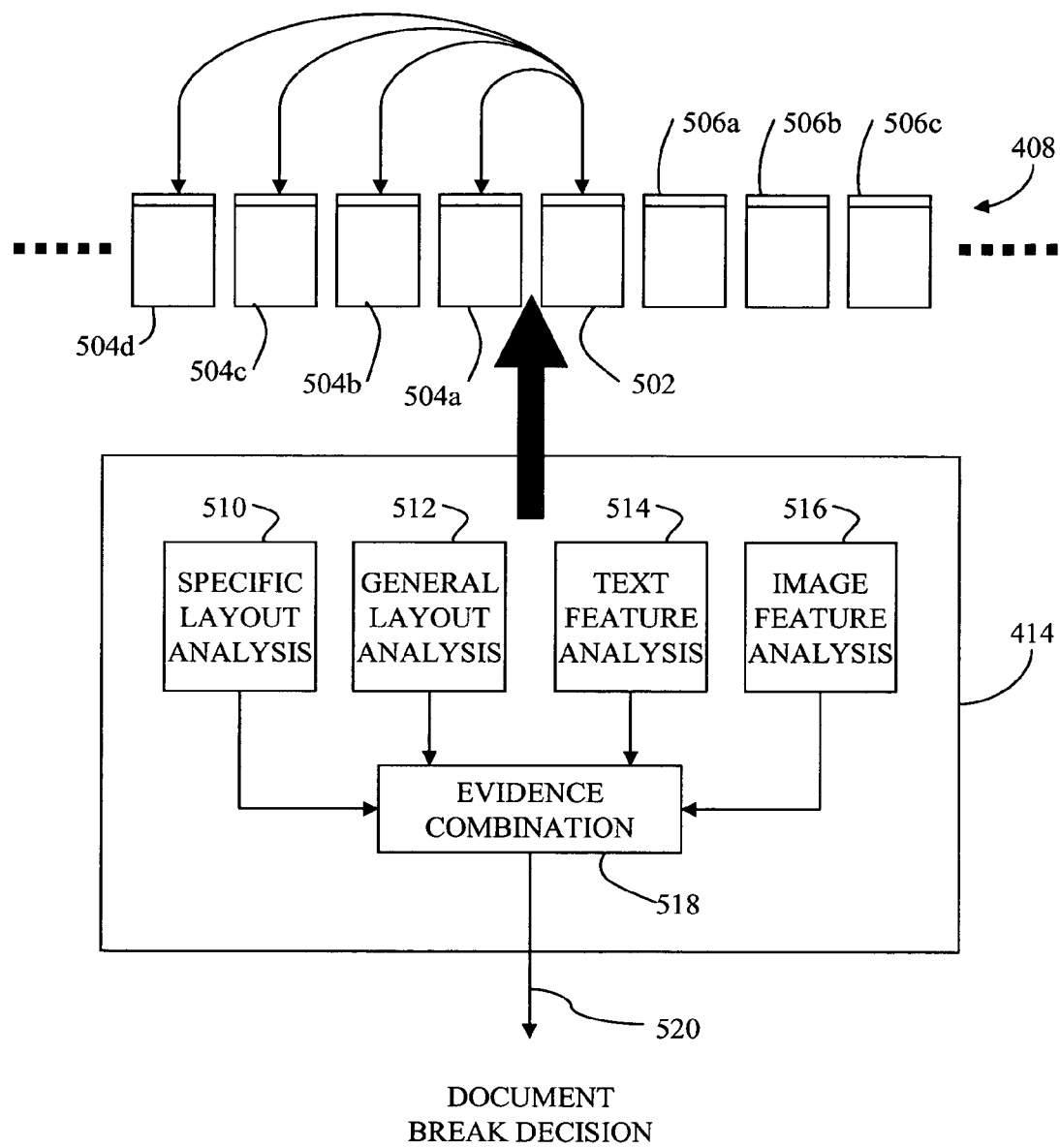
FIG. 5 is a schematic illustration of a comparison process in accordance with one embodiment of the present invention.

An embodiment of the comparison process 414 is illustrated in greater detail in FIG. 5. (Preferably, the comparison process 414 is carried out by a computer coupled to a scanner, although it may be carried out by the scanner itself.) In particular, FIG. 5 illustrates the comparison process for a current page 502 relative to at least one previous page 504. (Note that although the particular process described herein discusses the comparison of the current page against at least one previous page, it is anticipated that these techniques may equally incorporate at least one subsequent page 506.) In general, the comparison process 414 takes as input the feature attribute data (in order from most specific to least specific) resulting from the specific layout analysis 510, general layout analysis 512, the text feature analysis 514 and image feature analysis 516 and compares the respective feature attributes for different pages using an evidence combination process 518. In a preferred embodiment, the separate feature attributes are considered on such a most-specific-to-least-specific basis, as described below.

As noted above, the specific layout attributes are highly discriminating when available. Thus, the evidence combination process 518 determines, for example, whether page numbers are in sequence, whether the header and footer have the same format or whether there are figures having similar caption and/or sequential numbering. The following example describes such a process: when looking for a page number, the page number should appear in the line with no more than 10 words and it should appear on an upper or lower 15% of the page; page numbers should appear approximately in the same area; when a page number increment between two pages is one, the two pages likely belong to the same document.

In one embodiment, general layout attributes are initially compared by measuring the overlap area between regions on separate pages and their size similarity. In a preferred embodiment, the degree of overlap and size similarity is weighted according the difference (or similarity) of line and text statistics for the overlapping regions. These weighted metrics are then judged, for example through threshold comparisons, to determine whether a sufficient degree of similarity or dissimilarity is shown.

There are a variety of techniques for comparing text attributes, many based on the number of shared terms, or more generally, groups of statistically related terms. In a preferred embodiment, a normalized cosine measure, as known in the art, is used. This scheme has the advantages that it is fast to compute, it requires no special pre-training and it works for any language for which a wordbreaker can be defined. Generally, the normalized cosine measure represents the similarity between two passages of text as a distance in N-dimensional space. Where the distance is sufficiently small, the two passages may be considered sufficiently related to have come from the same document. Likewise, where the distance is sufficiently large, the two passages may be considered sufficiently unrelated to have come from separate documents.

Image attributes represent the coarsest attributes for comparison. Thus, overall color of pages and/or the average intensities can be compared and, if sufficiently similar, result in a judgment of similarity. In a preferred embodiment, wavelet coefficients are computed based on the scan data for each page. Generally, wavelet coefficients can be thought of as a spatially-aligned frequency decomposition of an input image. Thus, in a preferred embodiment, comparisons between low frequency wavelet coefficients are made to assess whether the low-frequency content of the two images (i.e., pages) are sufficiently similar to indicate membership in the same document. A method for performing such a similarity measure using wavelet coefficients is described by Charles E. Jacobs, Adam Finklestein, and David H Salesin in their paper "Fast Multiresolution image querying", Proceedings of SIGGRAPH '95, pages 277–286. ACM, New York, 1995, the teachings of which are incorporated herein by this reference.

The evidence combination process 518 performs comparisons of the types described above. The particular implementation of the evidence combination process 518 is a matter of design choice. Generally, the comparisons implemented therein need to be sufficiently stringent such that false positives (i.e., finding a document break when none exists) and misses (i.e., failing to detect a document break where one does exist) do not result. In a preferred embodiment, the evidence combination process 518 considers the various feature attributes in an order generally progressing from the most specific types of attributes to the least specific types of attributes. An example of such a process is illustrated in Table 1 below:

TABLE 1

=> Specific Layout and Text Similarity
   If page numbers are continuous, or sufficiently similar page headers/
   footers are found, these pages belong to the same document.
   If figures or tables are found in the pages, and the text density is
   below a predetermined threshold, and text similarity is above another
   predetermined threshold, these two pages belong to the same
   document.
=> General Layout and Text Similarity
   If the similarity of the general layouts is above a predetermined
   threshold, and text similarity is likewise above another predetermined
   threshold, these two pages belong to the same document.
=> Image Feature Similarity
   If wavelet similarity is above a predetermined threshold, these two
   pages belong to the same document.
=> Otherwise, these two pages belong to different document.

As shown, the specific layout attributes are considered first, then the general layout attributes and image feature attributes. Note that in this example, the textual feature attributes are included as part of the comparisons of the other feature attributes. Those having ordinary skill in the art could readily identify different processes where, for example, the textual attributes are separately considered. Regardless of the particular evidence combination process used, a document break decision 520 is provided for each page. Once a page has been considered in this manner, the same processing is performed for all subsequent pages until the last page has been reached.

Figure 6:
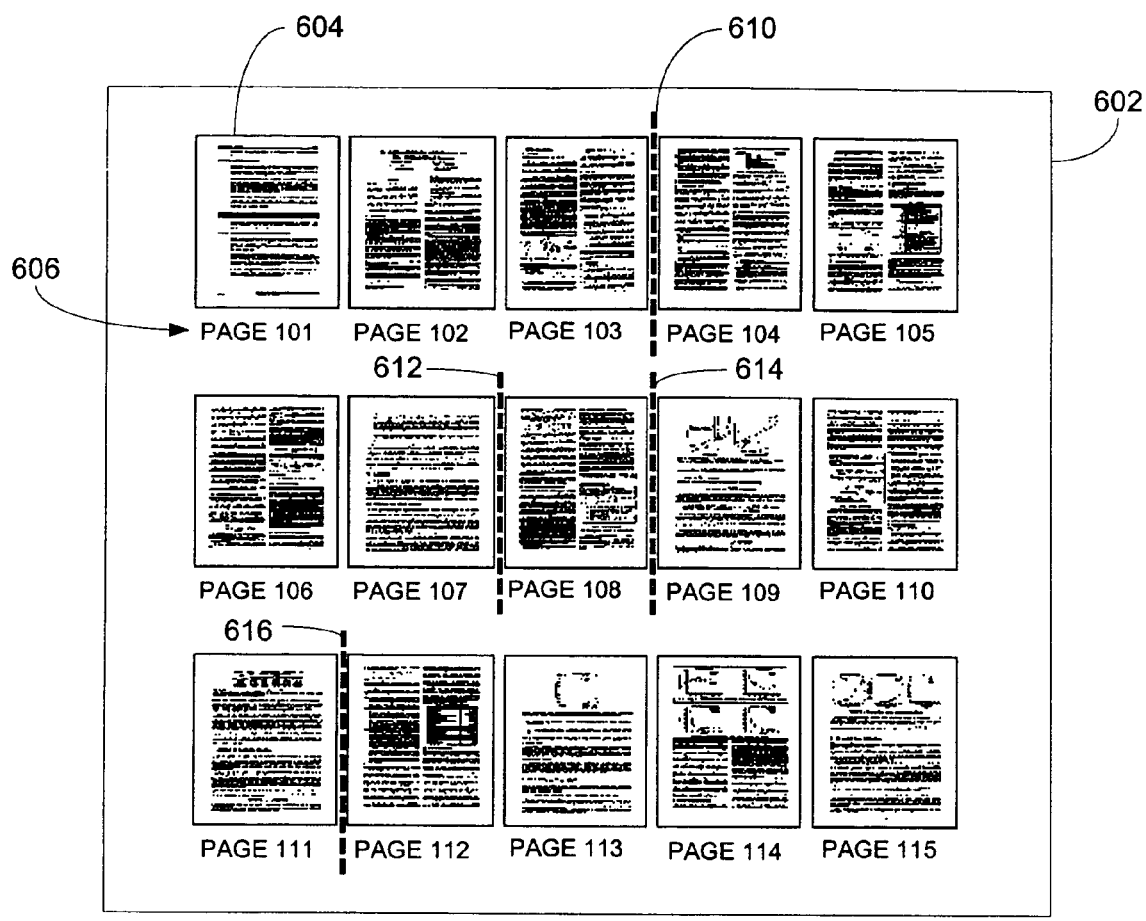
FIG. 6 is an exemplary screen shot illustrating a display in accordance with an embodiment of the present invention.

Referring now to FIG. 6, an exemplary screen shot is illustrated upon a display 602, such as a computer monitor and the like. As shown, a page sequence comprising a series of pages 604 having page labels 606, in this case, pages 101 through 115. In a preferred embodiment, each of the pages 604 is displayed as a so-called thumbnail image, i.e., a reduced size, reduced resolution image. In this manner, multiple pages can be simultaneously displayed in sequential order. Also illustrated in FIG. 6 are several exemplary document breaks 610–616 indicated through the use of heavy dashed lines. Where the display 602 is rendered in color, different types of visual indicia, such as different border colors, may be used to indicate a document break. Those having ordinary skill in the art will recognize that many other schemes could be used to indicate document breaks within the display 602. Where a selection device is provided, such as a mouse used to control a cursor or the like, a user may select any of the document breaks 610–616 for modification, as described above. For example, the document break having reference numeral 616 could be removed by double-clicking thereon. Alternatively, a double-click performed on a region between two of the pages not currently indicating the presence of a document break could cause one to be inserted. Further still, any of the displayed document breaks 610–616 could be moved simply by clicking thereon and dragging the document break to a new region between two pages. Once again, those having ordinary skill in the may devise numerous methods for modifying document breaks through the use of a display.

Prototype tests of the present invention have demonstrated a greater than 90% success rate at correctly identifying the existence of document breaks, without user intervention, in batch scanned documents. As such, the present invention represents a significant advance in the art. Furthermore, what has been described is merely illustrative of the application of the principles of the present invention. Other arrangements and methods can be implemented by those skilled in the art without departing from the spirit and scope of the present invention.

We claim:

1. A computer-readable medium having stored thereon a data structure comprising:
   data representative of a page sequence resulting from a batch scanning process of at least two documents; and
   data representative of at least one feature attribute for each page of the page sequence and having a one-to-one association with each page of the page sequence, wherein the data is used to determine existence of a document break between the at least two documents of the page sequence.

2. The computer-readable medium of claim 1, further comprising data representative of a document break between the at least two documents when corresponding data representative of the at least one feature attribute for one page is sufficiently dissimilar to corresponding data representative of the at least one feature attribute for an adjacent page.

3. The computer-readable medium of claim 2, wherein the at least one feature attribute is two or more feature attributes.

4. The computer-readable medium of claim 1, wherein each page of the page sequence is separately distinguishable from each other page.

5. The computer-readable medium of claim 1, wherein the at least one feature attribute comprises any of: at least one specific layout attribute, at least one general layout attribute, at least one textual attribute, and at least one image attribute.

6. The computer-readable medium of claim 5, wherein the at least one specific layout attribute comprises any of: page numbers, headings, page headers, page footers, and captions.

7. The computer-readable medium of claim 5, wherein the at least one general layout attribute comprises any of: block locations, block dimensions, block line statistics, and block text statistics.

8. The computer-readable medium of claim 5, wherein the at least one textual attribute comprises any of: word statistics and textual continuity.

9. The computer-readable medium of claim 5, wherein the at least one image attribute comprises any of: color, intensity histograms, wavelet coefficients, and connected component statistics.

10. A method for discriminating between documents within a plurality of scanned pages resulting from a batch scanning process of at least two documents, the method comprising steps of:
  receiving data representative of scanned pages of at least two documents, absent modification to the scanned pages;
  determining, for each scanned page of the plurality of scanned pages, at least one feature attribute;
  comparing the at least one feature attribute for a current scanned page of the plurality of scanned pages with a corresponding at least one feature attribute for at least one previous scanned page of the plurality of scanned pages; and
  determining existence of a document break between the current scanned page and a least distant scanned page of the at least one previous scanned page.

11. The method of claim 10, wherein the step of determining existence of a document break occurs when the step of comparing indicates that the current scanned page and the least distant scanned page are sufficiently dissimilar.

12. The method of claim 10, wherein the at least one feature attribute includes at least two feature attributes.

13. The method of claim 12, wherein the step of determining existence of a document break occurs when the step of comparing indicates that the current scanned page and the least distant scanned page are sufficiently dissimilar.

14. The method of claim 12, wherein the step of determining existence of a document break occurs when the step of comparing fails to indicate that the current scanned page and the least distant scanned page are sufficiently similar.

15. The method of claim 10, wherein the step of determining existence of a document break occurs when the step of comparing fails to indicate that the current scanned page and the least distant scanned page are sufficiently similar.

16. The method of claim 10, wherein the step of determining existence of a document break occurs when the step of comparing indicates that the current scanned page and the least distant scanned page are more dissimilar than similar.

* * * * *